United States Patent [19]

Baker et al.

[11] 4,243,230
[45] Jan. 6, 1981

[54] LOW ENERGY TANDEM SEAL

[75] Inventors: Dorsey L. Baker, West Chicago; Josef Sedy, Glenview, both of Ill.

[73] Assignee: Crane Packing Co., Morton Groove, Ill.

[21] Appl. No.: 80,276

[22] Filed: Oct. 1, 1979

[51] Int. Cl.³ .......................... F16J 15/34; F16J 15/40
[52] U.S. Cl. .......................................... 277/3; 277/27; 277/53; 277/65; 277/134
[58] Field of Search .................. 277/3, 27, 53, 65, 134

[56] References Cited

U.S. PATENT DOCUMENTS

| 3,026,112 | 3/1962 | Mayer | 277/3 |
| 3,213,798 | 10/1965 | Carswell | 277/134 |
| 3,558,238 | 1/1971 | Van Herpt | 277/134 |
| 3,746,350 | 7/1973 | Mayer et al. | 277/134 |
| 3,937,477 | 2/1976 | Gyory | 277/134 |

Primary Examiner—Robert I. Smith
Attorney, Agent, or Firm—Dorsey L. Baker

[57] ABSTRACT

This invention is directed to a low energy tandem seal which includes an end face seal cooperatively interconnected to a dynamic seal for sealing the circumferential space between a housing and a shaft. Under static non-operating conditions, the end face seal precludes fluid loss from the housing. Upon rotation of the shaft, the low energy dynamic seal provides fluid pressure which opposes loss of fluid from the housing and which disengages the end face seal to avoid a loss of energy and to reduce wear.

20 Claims, 3 Drawing Figures

LOW ENERGY TANDEM SEAL

BACKGROUND OF THE INVENTION

This invention relates to a tandem seal for precluding fluid leakage from the circumferential space between a shaft and a housing. It includes an end face seal uniquely coupled to a dynamic pressure generating seal. During static conditions, the end face seal precludes loss of fluid. During rotation of the shaft the dynamic seal precludes loss of fluid and disengages the end face seal.

Mechanical end face seals have become an accepted device to seal the circumferential space between a shaft and a housing. Such seals include two seal washers. One is mounted in sealing engagement on the shaft and is usually biased axially towards the housing. The other washer is fixed to the housing. The two washers have radially extending faces in rotating contact which are sufficiently flat to preclude fluid leakage. While such seals are quite acceptable, they do utilize energy. The rotating contact between the faces results in undersirable friction losses.

The loss has been previously recognized and attempts have been made to eliminate it. One prior design is illustrated by U.S. Pat. No. 1,947,017. In that design, the patentee uses an end face seal to preclude loss of fluid during the static - non-operating condition of the pump. Upon rotation of the shaft, a hydraulic cylinder responding to fluid pressure disengages the end face seal and a separate repeller is used to limit or preclude leakage from between the pump housing and the shaft. This design is complicated. It requires a separate repeller and chamber in the pump housing. It also requires an external pressure sensing chamber, a separate hydraulic cylinder and complicated linkages. Another design is sold by the Sealol Company. As depicted in the brochure attached to this application, this design also utilizes a separate repeller and sophisticated pressure sensing chamber.

Our invention is a tandem seal preferably arranged in cartridge form which can be installed in existing pump housings. It eliminates the use of a separate repeller, modification of the pump housing casting to include a repeller chamber and incurs minimum power losses in effecting its sealing function. Wear and seal part replacement problems are substantially eliminated.

SUMMARY OF THE INVENTION

Our invention is a static-dynamic seal arrangement for a pump housing formed of a combination end face seal and a dynamic pumping seal. The two seals are interconnected physically and functionally such that the end face seal is operative during static conditions and inoperative during dynamic conditions. Under the later conditions, the pumping seal precludes loss of fluid.

In the preferred embodiment, the invention takes the form of a cartridge type unit which is preassembled for installation over and concentric with the pumping shaft. Neither embodiment requires modification of existing pump housings or the use of repellers or other linkages. In both embodiment, the preferred form of the dynamic - pumping seal is a set of small diameter pumping rings mounted within a pressure sensitive chamber which is axially movable to effect disengagement of the end face seal during pump operation.

The objects of our invention is to provide a small integral tandem seal which eliminates the use of pump housing modifications and impellers and friction-power losses.

BRIEF DESCRIPTION OF THE DRAWING

The manner in which these and other objects will be made clear in the following description and drawings in which.

DETAILED DESCRIPTION OF THE PREFERRED EMBODIMENT

Figure 1:
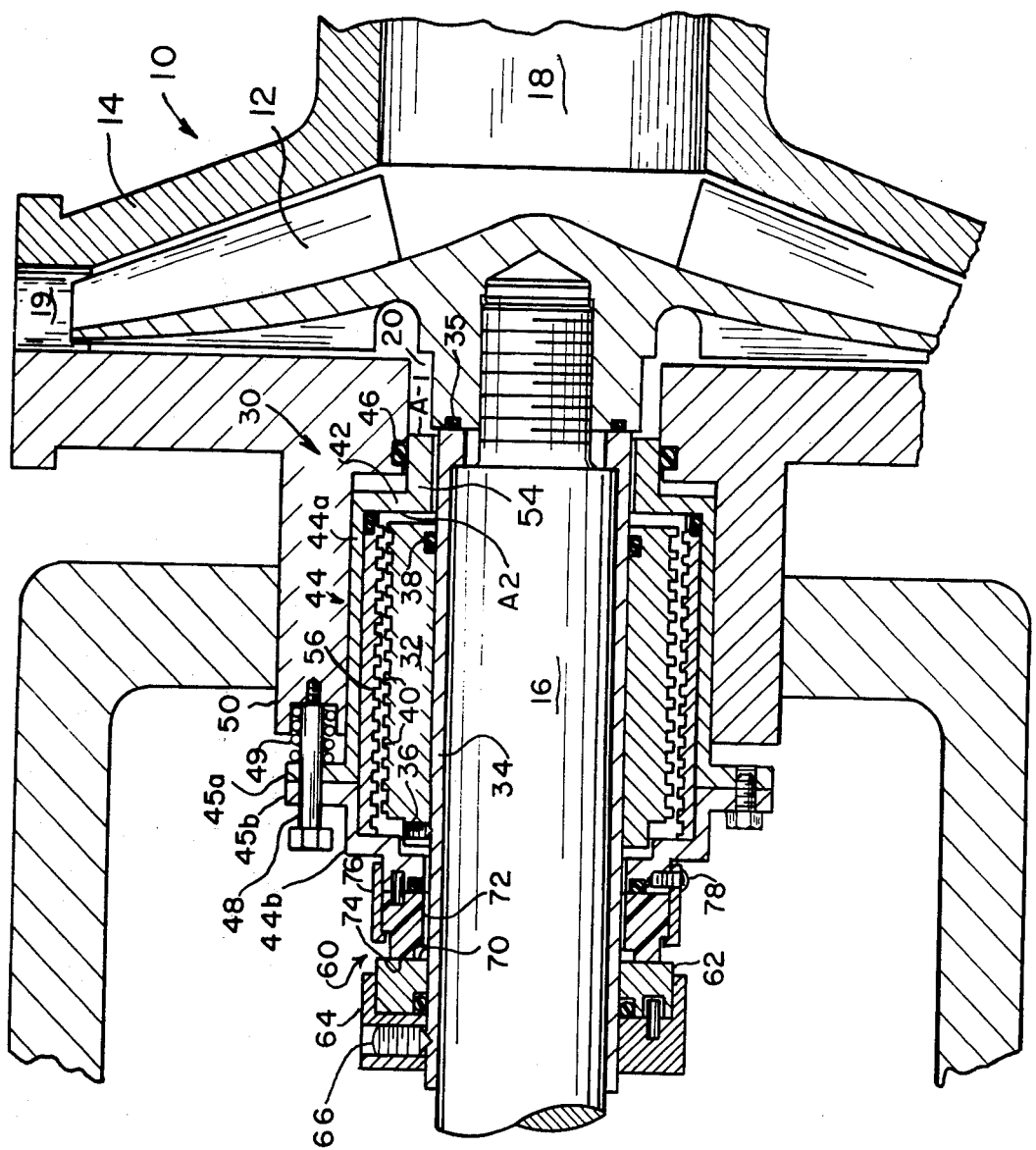
FIG. 1 is a side elevation view in section of a preferred embodiment of our invention.
Figure 2:
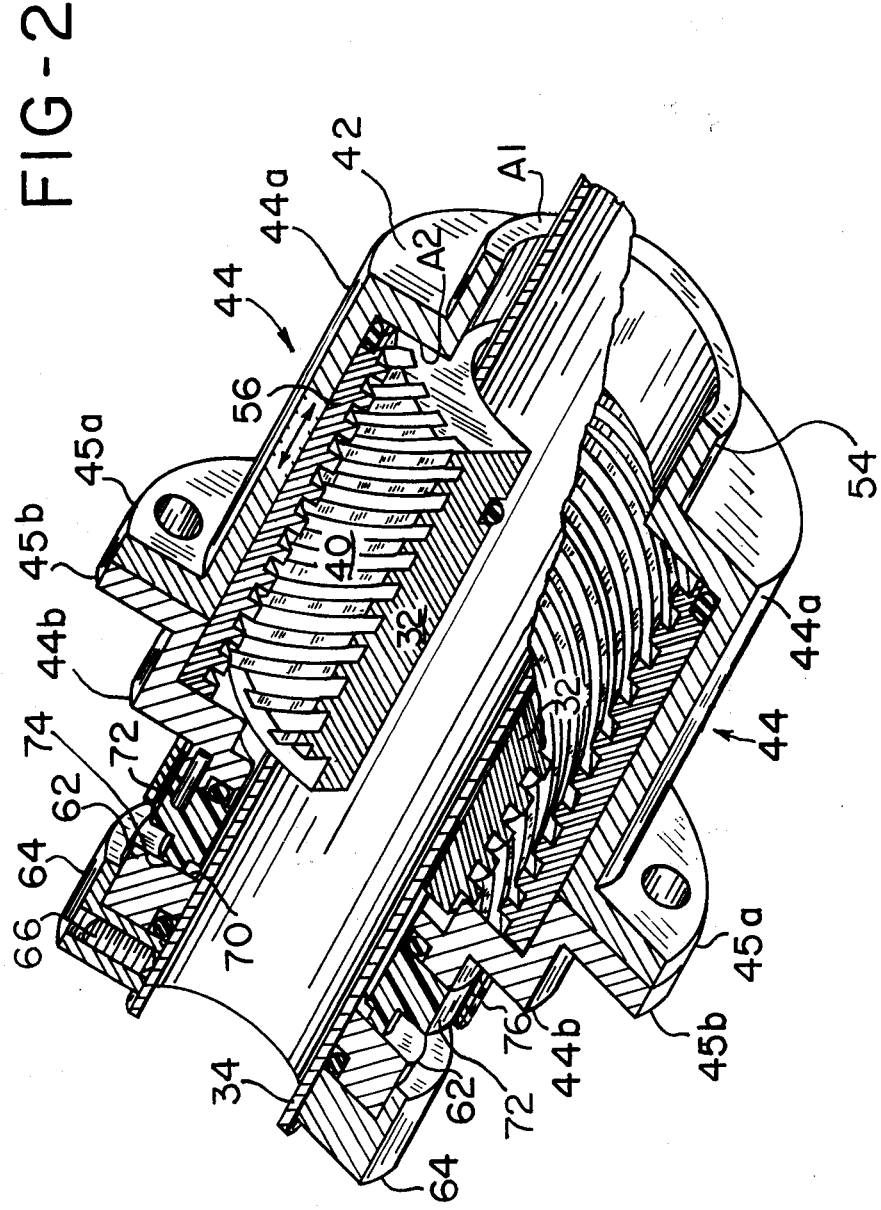
FIG. 2 is a perspective view of the embodiment of FIG. 1 with portion broken away.

As illustrated in FIGS. 1 and 2 a preferred embodiment of our invention is associated with a centrifugal pump 10. This pump 10 includes an impeller 12 which is positioned within a housing 14 and driven by a shaft 16. Upon rotation of the shaft 16 and impeller 12, fluid is drawn through an intake 18 and forced radially outward towards the periphery of the housing 10 on which is located a discharge conduit 19.

Our invention is interposed between the housing 14 of the pump 10 and the shaft 16. Its purpose is to preclude, with minimum energy requirements, the loss of fluid through the circumferential space 20 between the housing 14 and the shaft 16. This loss of fluid can occur either when the pump is operating and generating fluid pressure or when it is static - not operating, the fluid leakage resulting from a pressure head existing at the pump intake 18.

The space 20 normally sealed by a mechanical end face seal. These seals, however, do utilize energy and incur friction losses during operating conditions. Our invention does include such a seal. However, it is effective only when the pump is not operating and is used to seal the space 20 against leakage from a fluid pressure head existing within the pump. Under these conditions, the seal incurs no friction losses and uses no energy.

During operation of the pump, or invention uses a low energy dynamic sealing means 30 to preclude fluid leakage. This sealing means generates a back pressure opposing the flow of fluid from the housing 14 and includes a pressure responsive means which disengages the washers of the end face seal 60 to eliminate friction losses. It is our belief that this dynamic seal, while requiring some energy, may reduce the total seal energy loss incurred by the end face seal by at least one half. Moreover, we believe that the energy loss incurred by the dynamic seal is directly proportional to the diameter of the repeller. Contrary to the use of a large diameter repeller, our dynamic seal uses pumping rings having a small diameter - further reducing the energy loss.

As shown in FIGS. 1 and 2, the dynamic sealing means is indicated at 30 and the static or end face sealing means is indicated at 60. Preferably, these two sealing means are physically interconnected to insure cooperative results in sealing the space 20 with a minimum energy loss.

The dynamic seal 30 is positioned concentric of shaft 16. It includes an internal threaded member or pumping ring 32 which is mounted on the shaft for rotation therewith. The mounting may take the form of a sleeve 34 which carries the entire seal assembly. This sleeve is mounted over the shaft and is sealed by an o-ring 35.

The inner pumping ring 32 is mounted over this sleeve and constrained for rotation with the sleeve by one or more set screws 36. An o-ring 38 may be used as a seal between the inner ring 32 and sleeve 34. Threads 40 are formed on the outer circumference of the pumping ring which, upon rotation, will pump fluid or develop fluid pressure acting in the direction of the impeller 12 to oppose fluid pressure developed by the impeller within the housing 14.

As depicted in FIG. 1, the pressure generated by this inner pumping ring is directed against a radial flange 42 of a pressure responsive collar 44 which, together with the ring define a pressure chamber. This collar is concentric of shaft 16 and has two sections 44a and 44b. As shown, it is sealingly mounted in the housing 14 by an o-ring 46, and a plurality of guide bolts 48 so as to be capable of axial movement. Springs 49 mounted on guide bolts 48 exert an axial expansion force between a rearward extending hub 50 of housing 14 and a radial flange 45a of the collar section 44a. This spring force urges the collar away from the impeller 12. In addition, fluid pressure in the housing 14 acts upon the face A-1 of forward reduced section 54 of collar 44 to urge the collar in the same direction. However, upon rotation of the shaft 16, the pumping ring 32 will tend to pump fluid towards the impeller 12 and develops a fluid pressure within the collar 44 which opposes fluid leakage through the space 20 and which acts upon the surface A-2 of flange 42 to shift the pressure responsive collar 44 towards the impeller 12. The pumping ring, the areas A-1 and A-2 and the springs should be designed and sized such that the pressure generated is sufficient to oppose fluid pressure in housing 14 and simultaneously shift the pressure responsive collar 44 to the right. If desired, an outer pumping ring 56 may be inserted within the collar 44 as shown in the drawings. The design of the pumping rings and the threads which maximizes fluid pressure are known to those skilled in the art. In the preferred embodiment, the design is made in accord with threaded pumping principles set forth in a paper presented at the Fourth International Conference on Fluid Sealing by A. I. Golubiev, and in an article appearing in "Wear" magazine, Volume 8, pages 279–288 by A. I. Golubiev; each of said documents being attached to this application. The dynamic sealing utilizes very little energy and is believed to require less than one half of the energy normally consumed by end face seals.

However, when the pump is not operating, no dynamic sealing occurs. For this reason, applicants' invention includes a cooperative end face seal 60 which is activated by the absence of fluid pressure dynamic sealing. Under static conditions, the springs 49 urge the pressure collar or sleeve 44 away from the impeller 12 to effect engagement of the end face seal 60. This seal includes a sealing washer 62 which is sealingly mounted on the sleeve 34 and constrained for rotation therewith by a retainer 64 held in place by a set screw 66. The washer has a radially extending sealing surface 70. Under static, non-operating conditions, a second washer 72 has a radially extending face 74 in mating sealing engagement with the face 70. This washer is carried by and moves axially with pressure responsive means 44. A retainer 76, preferably in the shape shown, interconnects the washer 72 with section 44b of the collar 44 by one or more screws 78. The section 44b, as depicted, seats against the rear surface of washer 72 and has a radially extending flange 45b which abuts the flange 45a of collar 44. Under static conditions, the springs 48 urge pressure collar away from the impeller 12 and biases washer 72 into engagement with washer 62.

Thus, during non pumping, static conditions, the end face washers 62 and 72 are engaged and seal the space 20 against loss of fluid. However, relative rotation between these engaged washers cause energy losses through heat and friction. For this reason, the dynamic seal 30 through its pumping action seals the space 20 during rotation of the shaft 16 and such pumping action simultaneously disengages the faces of the washers 62 and 72. This pumping and sealing action of dynamic seal 30 does utilize power but substantially less power than the end face seal 60. Moreover, since the dynamic seal disengages the washers 62 and 72, wear of their radial faces is significantly reduced. This reduction substantially increases the life of the washers and eliminates replacement costs.

Figure 3:
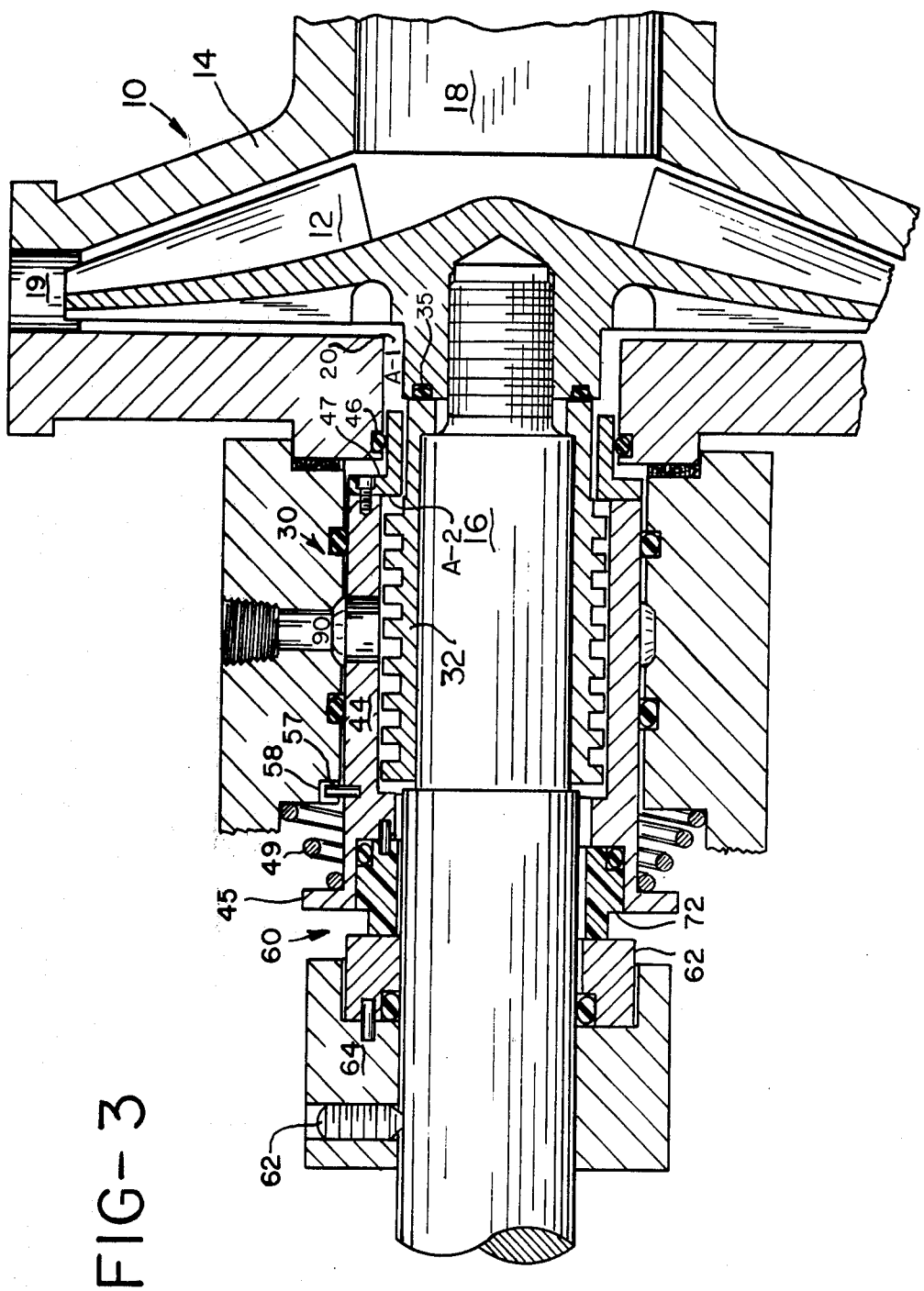
FIG. 3 is a side elevation view of another embodiment of our invention.

Another embodiment of our invention is depicted in FIG. 3. Similar to the first embodiment, this tandem seal has a dynamic seal 30 and a static end face seal 60. However, the dynamic seal 30 has only one pumping ring 32 which is directly carried by the shaft 16. The pressure sensitive collar 44 is provided with an outwardly extending flange 45 which is biased away from impeller 12 by a single coil spring 49. On the opposite end of the pressure sleeve 44 is a cylindrical flange 47 which has an L-shape cross section providing the areas A-1 and A-2 upon which fluid pressure acts. To permit assembly over the shaft, the flange 47 is bolted to pressure sleeve 44 as shown. One or more pins 57 acting within elongated slots 58 preclude rotational movement of sleeve 44 while permitting axial movement.

This embodiment also includes a pressure connection between the output port 19 of the pump and the pressure collar 44. Conduits (not shown) interconnect the port 19 with an aperture 90 in the flange 50. O-ring seals are placed on opposite sides of this aperture directing the fluid inwardly of sleeve 44. This fluid is pumped towards the impeller 12 to act against the area A-2 of radial flange 47. Contrary to our prior embodiment, in which the pumping ring 32 develops pressure with limited fluid flow, this embodiment develops pressure and may hav continued fluid flow through the pressure sensitive chamber.

The design of either embodiment may, in part be dictated by costs, space limitations and functional parameters of the pump unit 10. Those skilled in the art will appreciate that modifications of the various parts may be required to meet the various existing pump designs. Further, the invention is not limited to pump applications but may be used as a tandem labyrinth-end face seal having other applications. Similarly, the pumping action within the dynamic seal may take many forms.

We claim:

1. A tandem, static-dynamic, low energy seal for sealing the space between a housing and a rotating shaft, said seal comprising:
   (a) A first dynamic seal comprising:
      (1) An axially moveable pressure responsive collar sealingly mounted on said housing concentrically of said shaft;
      (2) Thread pumping ring means interposed between said collar and said shaft for developing fluid pressure opposing leakage of fluid from said housing and for axially moving said collar upon rotation of said shaft and development of fluid pressure;
(b) A second static seal for precluding leakage of fluid from said housing when said shaft is not developing sufficient pressure for axially moving said collar; said seal comprising:
(1) A first sealing washer sealingly mounted upon said shaft and having a radially extending sealing face;
(2) A second sealing washer sealingly mounted upon said collar, said second washer having a radially extending sealing face opposing the sealing face of said first washer, said washer being in sealing contact when said shaft is stationary and being separated by said pressure responsive collar upon the development of fluid pressure.

2. A seal as recited in claim 1 in which said seal is an elongated unit adapted to be mounted concentric of said shaft.

3. A seal as recited in claim 1 in which said threaded pumping means comprises an externally threaded member mounted for rotation with said shaft.

4. A seal as recited in claim 3 in which said threaded pumping means includes an internally threaded member concentrically mounted within said collar and circumscribes said externally threaded member.

5. An apparatus as recited in claim 1 in which biasing means urge said dynamic seal axially away from said space.

6. A low energy tandem seal for sealing the space between a housing and a shaft, said seal comprising:
(a) Dynamic sealing means interposed between said housing and said shaft for developing fluid pressure opposing leakage from said space and for axially translating upon development of fluid pressure;
(b) Sealing means interconnected between said dynamic sealing means and said shaft for precluding fluid leakage from said housing when said dynamic sealing means is not developing fluid pressure.

7. A seal as recited in claim 1 in which said dynamic sealing means is provided with a spring bias opposing axial translation of said dynamic sealing means.

8. A seal as recited in claim 6 in which said dynamic sealing means and said sealing means are carried by an elongated sleeve adapted to be mounted upon said shaft.

9. A seal as recited in claim 6 in which said sealing means is a mechanical end face seal having two sealing washers with radial seal faces, one of said washers being axially movable with said dynamic sealing means.

10. A seal as recited in claim 6 in which said dynamic sealing means comprises an elongated threaded pumping ring.

11. A seal as recited in claim 6 in which said dynamic sealing means is connected to a pressure source which delivers fluid pressure to said dynamic sealing means.

12. A pressure responsive low energy tandem seal for sealing the space between a housing and a shaft, said seal comprising:
(a) An end face seal having two washers with mating, radially extending flat surfaces for sealing said space when said shaft is not rotating, one of said washers being sealingly mounted upon the shaft for rotation therewith;
(b) A fluid pressure means mounted concentrically of said shaft and adapted to seal said space against fluid leakage upon rotation of said shaft, said fluid pressure generating means including pressure responsive means for axial translation in response to pressure;
(c) Said other washer of said end face seal being connected to said pressure responsive means for axial translation and separation of said washers in response to fluid pressure.

13. A seal as recited in claim 12 in which said fluid pressure means includes means mounted on said shaft for developing substantially all of said fluid pressure.

14. A seal as recited in claim 13 in which said means for developing fluid pressure includes elongated concentrically mounted internally and externally threaded pumping rings and a reaction surface area.

15. A seal as recited in claim 14 in which said fluid pressure means includes a biased sleeve concentrically mounted over said shaft and sealingly mounted in said housing.

16. A pressure responsive low energy tandem seal for sealing the circumferential space between a rotating shaft and its associated housing, said seal comprising:
(a) a dynamic seal positioned between the rotating shaft and said housing, said dynamic seal comprising fluid pumping means for generating fluid pressure inwardly of said housing opposing leakage of fluid therefrom, said seal having a component which is axially movable in response to a pressure differential created by said pumping means; and
(b) an end face seal for statically sealing said space when said shaft is not rotating, said seal having two sealing washers with flat radially extending mating faces, one of said washers being sealingly mounted on said shaft and the other being connected to said axially movable component, said washers being disengaged upon rotation of said shaft and actuation of said pumping means to reduce friction losses.

17. An apparatus as recited in claim 16 in which said pumping means comprises an elongated threaded member constructed for rotation with said shaft and said axially movable member is an elongated collar mounted in said housing coaxially of said threaded member.

18. An apparatus as recited in claim 17 in which a rotation of said shaft and said threaded member creates a pressure differential upon opposite ends of said elongated sleeve for axially moving said collar in a direction to disengage said washer.

19. An apparatus as recited in claim 17 in which said collar is internally threaded.

20. An apparatus as recited in claim 19 in which said collar is axially moved inwardly of said housing to disengage said washers.

* * * * *